United States Patent
Yu et al.

(10) Patent No.: US 11,482,211 B2
(45) Date of Patent: Oct. 25, 2022

(54) METHOD AND APPARATUS FOR OUTPUTTING ANALYSIS ABNORMALITY INFORMATION IN SPOKEN LANGUAGE UNDERSTANDING

(71) Applicant: Beijing Baidu Netcom Science and Technology Co., Ltd., Beijing (CN)

(72) Inventors: Zhenlong Yu, Beijing (CN); Tingting Li, Beijing (CN); Huifeng Sun, Beijing (CN); Shuqi Sun, Beijing (CN); Ke Sun, Beijing (CN); Hehan Li, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 102 days.

(21) Appl. No.: 16/895,630

(22) Filed: Jun. 8, 2020

(65) Prior Publication Data
US 2021/0201895 A1    Jul. 1, 2021

(30) Foreign Application Priority Data
Dec. 27, 2019    (CN) .......................... 201911378667.4

(51) Int. Cl.
G10L 15/10    (2006.01)
G10L 15/18    (2013.01)

(52) U.S. Cl.
CPC .......... G10L 15/10 (2013.01); G10L 15/1822 (2013.01)

(58) Field of Classification Search
None
See application file for complete search history.

(56) References Cited

U.S. PATENT DOCUMENTS

| | | | |
|---|---|---|---|
| 2009/0119586 A1* | 5/2009 | Weng | G06F 8/30 715/705 |
| 2014/0257794 A1 | 9/2014 | Gandrabur | |
| 2017/0103061 A1 | 4/2017 | Kobayashi | |
| 2018/0233141 A1* | 8/2018 | Solomon | G06K 9/00711 |
| 2018/0261216 A1* | 9/2018 | Leeb | G10L 15/1815 |
| 2019/0088256 A1 | 3/2019 | Lin | |
| 2019/0163438 A1 | 5/2019 | Ono | |
| 2020/0035244 A1* | 1/2020 | Kim | G06N 3/08 |
| 2020/0243074 A1 | 7/2020 | Taki et al. | |

(Continued)

FOREIGN PATENT DOCUMENTS

CN    107613132 A    1/2018
CN    109002501 A    12/2018

(Continued)

*Primary Examiner* — Jakieda R Jackson
(74) *Attorney, Agent, or Firm* — Nixon Peabody LLP (57) ABSTRACT

Embodiments of the present disclosure provide a method and apparatus for outputting analysis abnormality information in a spoken language understanding. The method includes: acquiring first spoken language information and a first analysis result for the first spoken language information; determining whether the first analysis result includes intent information; determining whether the first spoken language information includes a predefined word slot value, in response to determining the first analysis result not including the intent information; and outputting information indicating an existence of an abnormality in the first analysis result, in response to determining the first spoken language information including the predefined word slot value.

14 Claims, 5 Drawing Sheets

(56) References Cited

U.S. PATENT DOCUMENTS

| | | | |
|---|---|---|---|
| 2021/0082411 A1* | 3/2021 | Yasa | ................. G06N 20/00 |
| 2021/0097989 A1 | 4/2021 | Yong | |
| 2021/0200597 A1 | 7/2021 | Mochizuki et al. | |

FOREIGN PATENT DOCUMENTS

| | | | |
|---|---|---|---|
| CN | 109101545 | A | 12/2018 |
| CN | 109754809 | A | 5/2019 |
| CN | 110096570 | A | 8/2019 |
| JP | 2016061954 | A | 4/2016 |
| KR | 20190118995 | A | 10/2019 |
| WO | 2018055898 | A1 | 3/2018 |
| WO | 2019035373 | A1 | 2/2019 |
| WO | 2019176670 | A1 | 3/2021 |

\* cited by examiner

METHOD AND APPARATUS FOR OUTPUTTING ANALYSIS ABNORMALITY INFORMATION IN SPOKEN LANGUAGE UNDERSTANDING

CROSS-REFERENCE TO RELATED APPLICATIONS

This application claims priority to Chinese Patent Application No. 201911378667.4, filed on Dec. 27, 2019, titled "Method and apparatus for outputting analysis abnormality information in spoken language understanding," which is hereby incorporated by reference in its entirety.

TECHNICAL FIELD

Embodiments of the present disclosure relate to the field of computer technology, and specifically to a method and apparatus for outputting analysis abnormality information in a spoken language understanding.

BACKGROUND

With the development of artificial intelligence technology, a smart device (e.g., a smart phone and a smart stereo) is increasingly used by a wide range of users. A user may interact with the smart device via speech, such that the smart device may respond according to the speech made by the user. The smart device mainly analyzes the information inputted by the user through a Spoken Language Understanding (SLU) module, to facilitate subsequent processing for a business logic. However, in practical application, an analysis abnormal situation may occur in the SLU module. If the analysis abnormal situation can be mined out, the analysis effect of the SLU may be optimized with pertinence, thereby improving the user experience of a spoken dialogue system.

SUMMARY

Embodiments of the present disclosure provide a method and apparatus for outputting analysis abnormality information in a spoken language understanding In a first aspect, some embodiments of the present disclosure provide a method for outputting analysis abnormality information in a spoken language understanding, including: acquiring first spoken language information and a first analysis result for the first spoken language information; determining whether the first analysis result includes intent information; determining whether the first spoken language information includes a predefined word slot value, in response to determining the first analysis result not including the intent information; and outputting information indicating an existence of an abnormality in the first analysis result, in response to determining the first spoken language information including the predefined word slot value.

In some embodiments, the method further includes: determining whether the first analysis result includes word slot information; determining whether the intent information and the word slot information included in the first analysis result, and conversation state information constitute a performable candidate operation, in response to determining the first analysis result including the intent information and the word slot information; and outputting the information indicating the existence of the abnormality in the first analysis result, in response to determining the intent information and the word slot information included in the first analysis result, and the conversation state information not constituting the performable candidate operation.

In some embodiments, the conversation state information is from a second analysis result for second spoken language information, the second spoken language information including spoken language information in a previous round of conversation of the first spoken language information.

In some embodiments, the determining whether the intent information and the word slot information included in the first analysis result, and conversation state information constitute a performable candidate operation includes: determining whether the conversation state information includes intent information of a to-be-filled word slot matching the word slot information included in the first analysis result, in response to determining a type of the intent information included in the first analysis result being updating a word slot; and determining that the intent information and the word slot information included in the first analysis result, and the conversation state information do not constitute the performable candidate operation, in response to determining the conversation state information not including the intent information of the to-be-filled word slot.

In some embodiments, the method further includes: determining whether the first spoken language information includes to-be-clarified information, in response to determining the intent information and the word slot information included in the first analysis result, and the conversation state information constituting the performable candidate operation; and outputting the information indicating the existence of the abnormality in the first analysis result, in response to determining the first spoken language information including the to-be-clarified information.

In some embodiments, the intent information and the word slot information included in the first analysis result, and the conversation state information constitute at least two performable candidate operations, and the determining whether the first spoken language information includes to-be-clarified information includes: acquiring a confidence level of each of the performable candidate operations constituted by the intent information and the word slot information included in the first analysis result, and the conversation state information; and determining whether the first spoken language information includes the to-be-clarified information according to the acquired confidence level.

In some embodiments, the determining whether the first spoken language information includes the to-be-clarified information according to the acquired confidence level includes: determining the first spoken language information including the to-be-clarified information, in response to the acquired confidence level being smaller than a preset confidence level threshold.

In some embodiments, the determining whether the first spoken language information includes the to-be-clarified information according to the acquired confidence level includes: sorting candidate operations greater than the confidence level threshold in a descending order of a confidence level, and outputting the information indicating the existence of the abnormality in the first analysis result, in response to a difference between a confidence level of a candidate operation ranked first and a confidence level of a candidate operation ranked second being less than a preset threshold.

In some embodiments, the method further includes: acquiring third spoken language information and a third analysis result for the third spoken language information, the third spoken language information including spoken language information in a next round of conversation of the first spoken language information.

In some embodiments, the method further includes: outputting the information indicating the existence of the abnormality in the first analysis result, in response to determining the first spoken language information including a word slot value in the third analysis result and determining the first analysis result not including the word slot value in the third analysis result.

In some embodiments, the method further includes: outputting the information indicating the existence of the abnormality in the first analysis result, in response to determining the third analysis result including the intent information and the word slot information, determining the first analysis result not including the intent information and/or the word slot information, and determining a similarity between the first spoken language information and the third spoken language information exceeding a preset threshold.

In a second aspect, some embodiments of the present disclosure provide an apparatus for outputting analysis abnormality information in a spoken language understanding, including: a first acquiring unit, configured to acquire first spoken language information and a first analysis result for the first spoken language information; a first determining unit, configured to determine whether the first analysis result includes intent information; a second determining unit, configured to determine whether the first spoken language information includes a predefined word slot value, in response to determining the first analysis result not including the intent information; and a first outputting unit, configured to output information indicating an existence of an abnormality in the first analysis result, in response to determining the first spoken language information including the predefined word slot value.

In some embodiments, the apparatus further includes: a third determining unit, configured to determine whether the first analysis result includes word slot information; a fourth determining unit, configured to determine whether the intent information and the word slot information included in the first analysis result, and conversation state information constitute a performable candidate operation, in response to determining the first analysis result including the intent information and the word slot information; and a second outputting unit, configured to output the information indicating the existence of the abnormality in the first analysis result, in response to determining the intent information and the word slot information included in the first analysis result, and the conversation state information not constituting the performable candidate operation.

In some embodiments, the conversation state information is from a second analysis result for second spoken language information, the second spoken language information including spoken language information in a previous round of conversation of the first spoken language information.

In some embodiments, the fourth determining unit includes: a first determining module, configured to determine whether the conversation state information includes intent information of a to-be-filled word slot matching the word slot information included in the first analysis result, in response to determining a type of the intent information included in the first analysis result being updating a word slot; and a second determining module, configured to determine that the intent information and the word slot information included in the first analysis result, and the conversation state information do not constitute the performable candidate operation, in response to determining the conversation state information not including the intent information of the to-be-filled word slot.

In some embodiments, the apparatus further includes: a fifth determining unit, configured to determine whether the first spoken language information includes to-be-clarified information, in response to determining the intent information and the word slot information included in the first analysis result, and the conversation state information constituting the performable candidate operation; and a third outputting unit, configured to output the information indicating the existence of the abnormality in the first analysis result, in response to determining the first spoken language information including the to-be-clarified information.

In some embodiments, the intent information and the word slot information included in the first analysis result, and the conversation state information constitute at least two performable candidate operations, and the fifth determining unit includes: a first acquiring module, configured to acquire a confidence level of each of the performable candidate operations constituted by the intent information and the word slot information included in the first analysis result, and the conversation state information; and a third determining module, configured to determine whether the first spoken language information includes the to-be-clarified information according to the acquired confidence level.

In some embodiments, the third determining module is further configured to: determine the first spoken language information including the to-be-clarified information, in response to the acquired confidence level being smaller than a preset confidence level threshold.

In some embodiments, the third determining module is further configured to: sort candidate operations greater than the confidence level threshold in a descending order of a confidence level, and output the information indicating the existence of the abnormality in the first analysis result, in response to a difference between a confidence level of a candidate operation ranked first and a confidence level of a candidate operation ranked second being less than a preset threshold.

In some embodiments, the apparatus further includes: a second acquiring unit, configured to acquire third spoken language information and a third analysis result for the third spoken language information, the third spoken language information including spoken language information in a next round of conversation of the first spoken language information.

In some embodiments, the apparatus further includes: a fourth outputting unit, configured to output the information indicating the existence of the abnormality in the first analysis result, in response to determining the first spoken language information including a word slot value in the third analysis result and determining the first analysis result not including the word slot value in the third analysis result.

In some embodiments, the apparatus further includes: a fifth outputting unit, configured to output the information indicating the existence of the abnormality in the first analysis result, in response to determining the third analysis result including the intent information and the word slot information, determining the first analysis result not including the intent information and/or the word slot information, and determining a similarity between the first spoken language information and the third spoken language information exceeding a preset threshold.

In a third aspect, some embodiments of the present disclosure provide a device, including: one or more processors; and a storage apparatus, configured to store one or more programs, where the one or more programs, when executed by the one or more processors, cause the one or more processors to implement the method in the first aspect.

In fourth aspect, some embodiments of the present disclosure provide a computer readable medium, storing a computer program, wherein the program, when executed by a processor, implements the method in the first aspect.

According to the method and apparatus for outputting analysis abnormality information in a spoken language understanding provided in the embodiments of the present disclosure, the first spoken language information and the first analysis result for the first spoken language information are acquired. Whether the first analysis result includes the intent information is determined. In response to determining the first analysis result not including the intent information, whether the first spoken language information includes the predefined word slot value is determined. In response to determining the first spoken language information including the predefined word slot value, the information indicating the existence of the abnormality in the first analysis result is outputted. Thus, the efficiency of outputting the analysis abnormality information in the spoken language understanding is improved.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

The present disclosure is further described below in detail by combining accompanying drawings and embodiments. It may be appreciated that the specific embodiments described herein are merely used for explaining the relevant disclosure, rather than limiting the disclosure. In addition, it should be noted that, for ease of description, only parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
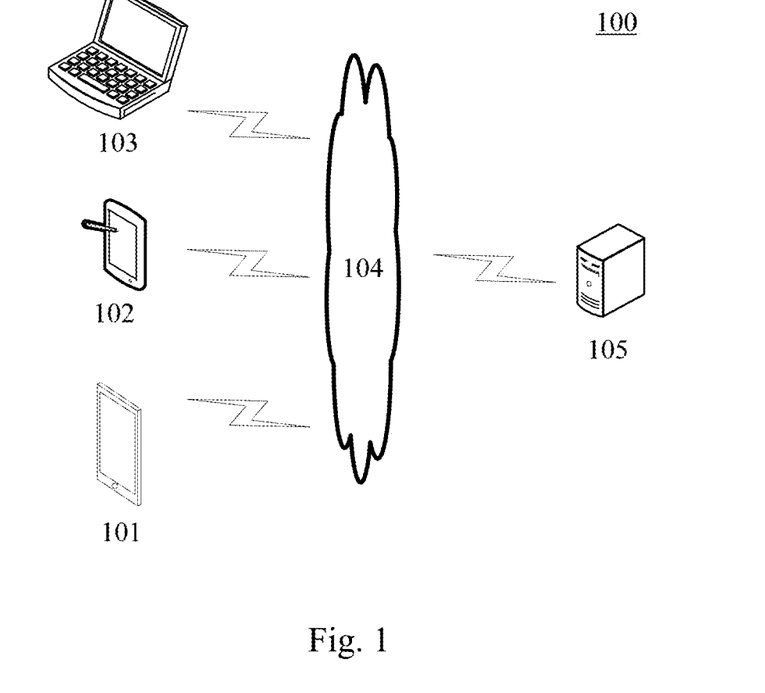
FIG. 1 is a diagram of an exemplary system architecture in which some embodiments of the present disclosure may be applied.

FIG. 1 illustrates an exemplary system architecture 100 in which a method for outputting analysis abnormality information in a spoken language understanding or an apparatus for outputting analysis abnormality information in a spoken language understanding according to embodiments of the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 by using the terminal devices 101, 102 and 103, to receive or send a message, etc. Various client applications (e.g., a voice assistant application, an e-commerce application and a search application) may be installed on the terminal devices 101, 102 and 103.

The terminal devices 101, 102 and 103 may be hardware or software. When the terminal devices 101, 102 and 103 are the hardware, the terminal devices 101, 102 and 103 may be various electronic devices having a display screen, the electronic devices including, but not limited to, a smart phone, a tablet computer, a laptop portable computer, a desktop computer, etc. When the terminal devices 101, 102 and 103 are the software, the terminal devices 101, 102 and 103 may be installed in the above listed electronic devices. The terminal devices may be implemented as a plurality of pieces of software or a plurality of software modules, or may be implemented as a single piece of software or a single software module, which will not be specifically defined here.

The server 105 may be a server providing various services, for example, a backend server providing support for the applications installed on the terminal devices 101, 102 and 103. The server 105 may acquire first spoken language information and a first analysis result for the first spoken language information; determine whether the first analysis result includes intent information; determine whether the first spoken language information includes a predefined word slot value, in response to determining the first analysis result not including the intent information; and output information indicating an existence of an abnormality in the first analysis result, in response to determining the first spoken language information including the predefined word slot value.

It should be noted that the method for outputting analysis abnormality information in a spoken language understanding provided in the embodiments of the present disclosure may be performed by the server 105, or performed by the terminal devices 101, 102 and 103. Correspondingly, the apparatus for outputting analysis abnormality information in a spoken language understanding may be provided in the server 105, or provided in the terminal devices 101, 102 and 103.

It should be noted that the server may be hardware or software. When being the hardware, the server may be implemented as a distributed server cluster composed of a plurality of servers, or may be implemented as a single server. When being the software, the server may be implemented as a plurality of pieces of software or a plurality of software modules (e.g., software or software modules for providing a distributed service), or may be implemented as a single piece of software or a single software module, which will not be specifically defined here.

It should be appreciated that the numbers of the terminal devices, the networks and the servers in FIG. 1 are merely illustrative. Any number of terminal devices, networks and servers may be provided based on actual requirements.

Figure 2:
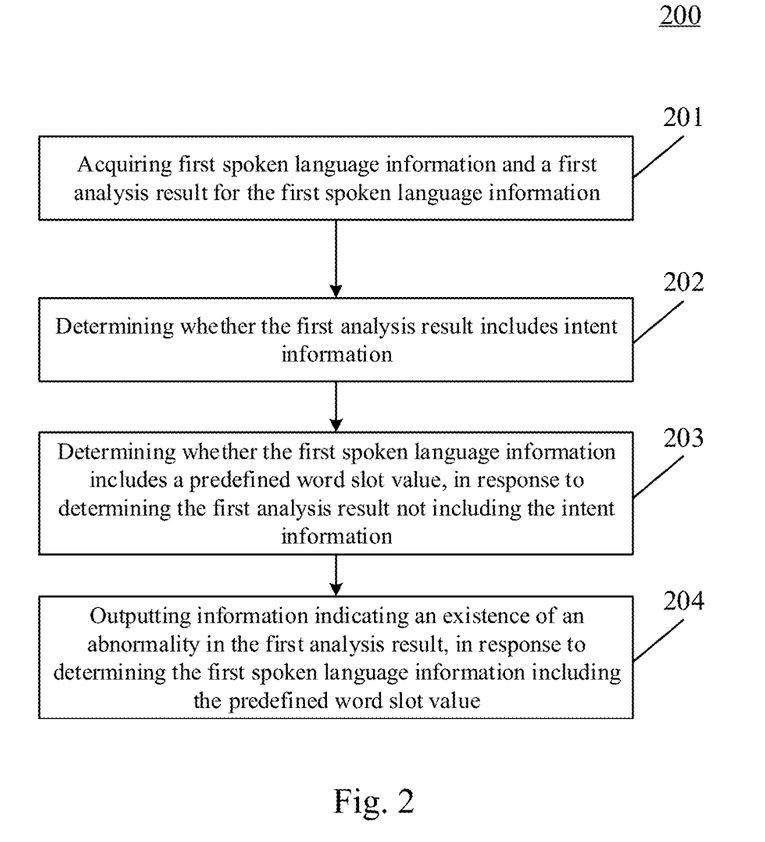
FIG. 2 is a flowchart of a method for outputting analysis abnormality information in a spoken language understanding according to an embodiment of the present disclosure.

Further referring to FIG. 2, FIG. 2 illustrates a flow 200 of a method for outputting analysis abnormality information in a spoken language understanding according to an embodiment of the present disclosure. The method for outputting analysis abnormality information in a spoken language understanding includes the following steps.

Step 201, acquiring first spoken language information and a first analysis result for the first spoken language information.

In this embodiment, an executing body (e.g., the server or the terminal shown in FIG. 1) of the method for outputting analysis abnormality information in a spoken language understanding may first acquire the first spoken language information and the first analysis result for the first spoken language information. The first spoken language information may include text information obtained through speech recognition on speech information inputted by a user in a speech interaction. The first analysis result includes a result of analyzing the first spoken language information through an SLU or a natural language understanding (NLU). The SLU or NLU may analyze the information inputted by the user into a combination of an intent and a word slot. For example, when the spoken language information is "I'm going to Xizhimen," the information may be analyzed into "planning a route (destination=Xizhimen)." When the spoken language information is "weather for tomorrow in Beijing," the information may be analyzed into "querying weather (city=Beijing, and time=tomorrow)." When the spoken language information is "booking a conference room for afternoon," the information may be analyzed into "booking a conference room (time=afternoon)." In addition, the above executing body may acquire the first spoken language information and the first analysis result for the first spoken language information from a spoken language dialogue system in real time, or may acquire the first spoken language information and the first analysis result for the first spoken language information from a history log of the spoken language dialogue system.

Step 202, determining whether the first analysis result includes intent information.

In this embodiment, the above executing body may determine whether the first analysis result acquired in step 201 includes the intent information. The intent information indicates a user intent, for example, in the analysis result "querying weather (city=Beijing, and time=tomorrow)," querying weather is the intent information.

Step 203, determining whether the first spoken language information includes a predefined word slot value, in response to determining the first analysis result not including the intent information.

In this embodiment, in response to determining the first analysis result not including the intent information in step 202, the above executing body may determine whether the first spoken language information includes the predefined word slot value. The predefined word slot value may include a word slot value predefined by the user and/or a word slot value predefined by an administrator in the spoken language dialogue system. Word slot information may include a word slot type and a word slot value. For example, in the word slot information "city=Beijing, and time=tomorrow," the word slot type may include "city" and "time," and the word slot value may include "Beijing" and "tomorrow."

Step 204, outputting information indicating an existence of an abnormality in the first analysis result, in response to determining the first spoken language information including the predefined word slot value.

In this embodiment, in response to determining the first spoken language information including the predefined word slot value in step 203, the above executing body may output the information indicating the existence of the abnormality in the first analysis result. Here, the information indicating the existence of the abnormality in the first analysis result may include an abnormality tag added for the first analysis result, or information stored in a pre-established abnormality log.

In some alternative implementations of this embodiment, the method further includes: acquiring third spoken language information and a third analysis result for the third spoken language information, the third spoken language information including spoken language information in a next round of conversation of the first spoken language information. The next round of conversation may include a conversation occurring after the current round of conversation in a dialogue. For example, in a conversation group, the user inputs "departure, Beijing," a device replies "being heading for Beijing," and the user inputs "departing from Beijing" again. Here, "departing from Beijing" is the spoken language information in the next round of conversation of "departure, Beijing." The acquisition of the spoken language information in the next round of conversation further enriches the data sources used to determine the abnormality of the analysis, thus making the outputted analysis abnormality information more comprehensive.

In some alternative implementations of this embodiment, the method further includes: outputting the information indicating the existence of the abnormality in the first analysis result, in response to determining the first spoken language information including a word slot value in the third analysis result and determining the first analysis result not including the word slot value in the third analysis result. For example, the first spoken language information in the current round is "k21 o'clock conference room." Since 21 is divided into one word, the recognition result is affected. The first analysis result does not include the word slot information "the number of the floor where the conference room is located=k2." The third spoken language information in the next round is "k2, 1 o'clock conference room," and the third analysis result is "booking a conference room (the number of the floor where the conference room is located=k2, and the time for the conference=1 o'clock)." Thus, the information indicating the existence of the abnormality in the first analysis result is outputted. As can be seen, since the SLU does not understand the current expression method, the user changes the way to express and emphasize the same information, and thus, the information indicating the existence of the abnormality in the first analysis result is outputted.

In some alternative implementations of this embodiment, the method further includes: outputting the information indicating the existence of the abnormality in the first analysis result, in response to determining the third analysis result including the intent information and the word slot information, determining the first analysis result not including the intent information and/or the word slot information, and determining a similarity between the first spoken language information and the third spoken language information exceeding a preset threshold. As an example, the first spoken language information is "giving a song of Jay Chou,"

the third spoken language information is "playing a song of Jay Chou," and the similarity between the first spoken language information and the third spoken language information exceeds the preset threshold. The third analysis result is "playing songs (singer=Jay Chou)," and the first analysis result does not include the intent information "playing songs" and/or the word slot information "singer=Jay Chou." Thus, the information indicating the existence of the abnormality in the first analysis result is outputted. The similarity between the first spoken language information and the third spoken language information exceeds the preset threshold, and it indicates that the user changes a statement to emphasize his intent after knowing that the first spoken language information is not correctly understood. Therefore, it is considered that the analysis for the first spoken language information is abnormal. The determination of the similarity herein may use various methods of determining the similarity of the text. For example, it is possible to compare whether the maximum ratio of the common subsequence between the first spoken language information and the third spoken language information exceeds a preset threshold.

According to the method provided in the above embodiment of the present disclosure, the first spoken language information and the first analysis result for the first spoken language information are acquired. Whether the first analysis result includes the intent information is determined. In response to determining the first analysis result not including the intent information, whether the first spoken language information includes the predefined word slot value is determined. In response to determining the first spoken language information including the predefined word slot value, the information indicating the existence of the abnormality in the first analysis result is outputted. Thus, the efficiency of outputting the analysis abnormality information in the spoken language understanding is improved. In addition, as compared with the existing technology in which the analysis abnormality information is outputted only when a dialogue error occurs, the comprehensiveness of the output of the abnormality information is improved.

Figure 3:
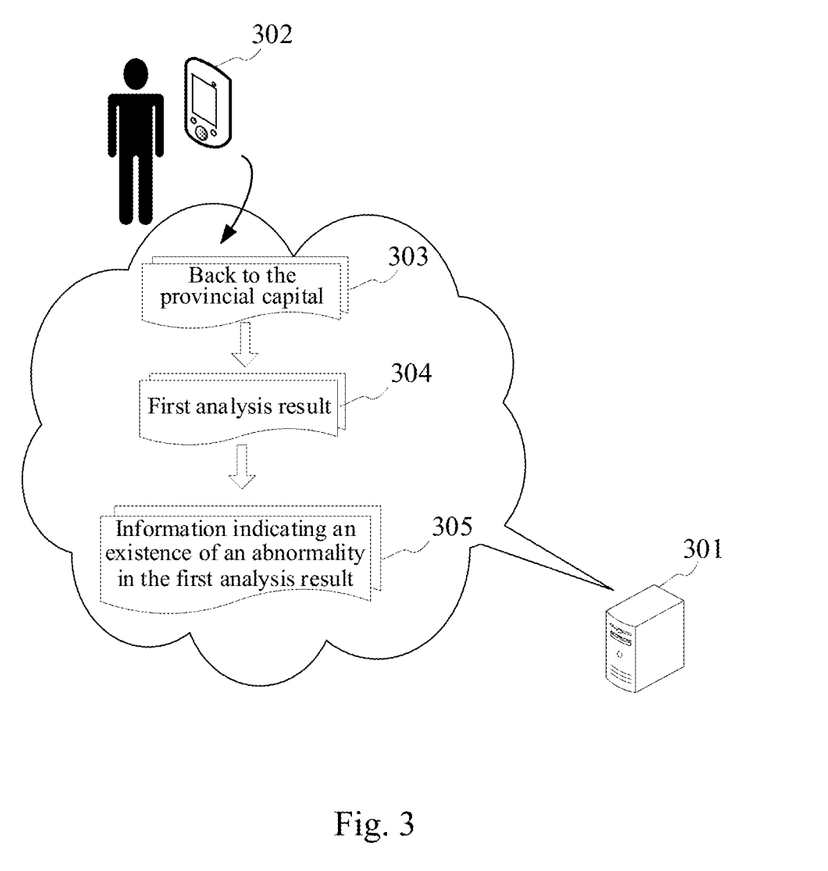
FIG. 3 is a schematic diagram of an application scenario of the method for outputting analysis abnormality information in a spoken language understanding according to an embodiment of the present disclosure.

Further referring to FIG. 3, FIG. 3 is a schematic diagram of an application scenario of the method for outputting analysis abnormality information in a spoken language understanding according to this embodiment. In the application scenario of FIG. 3, a server 301 acquires first spoken language information "back to the provincial capital" 303 inputted by a user through a terminal 302 and a first analysis result 304 for the first spoken language information "back to the provincial capital" 303. The server 301 determines whether the first analysis result 304 includes intent information. In response to determining the first analysis result 304 not including the intent information, the server 301 determines whether the first spoken language information "back to the provincial capital" 303 includes a predefined word slot value. In response to determining the first spoken language information "back to the provincial capital" 303 including the predefined word slot value "provincial capital," the server 301 outputs information 305 indicating an existence of an abnormality in the first analysis result.

Figure 4:
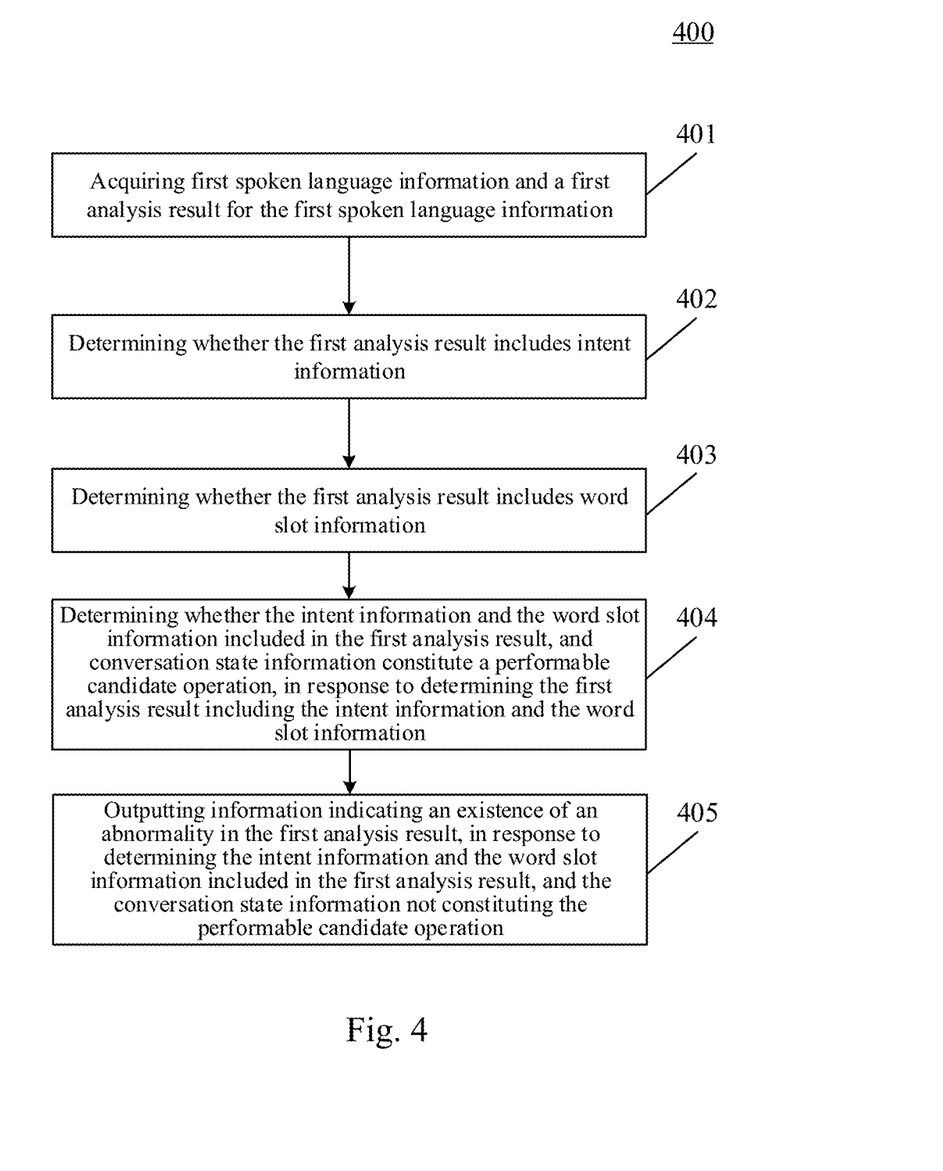
FIG. 4 is a flowchart of the method for outputting analysis abnormality information in a spoken language understanding according to another embodiment of the present disclosure.

Further referring to FIG. 4, FIG. 4 illustrates a flow 400 of the method for outputting analysis abnormality information in a spoken language understanding according to another embodiment. The flow 400 of the method for outputting analysis abnormality information in a spoken language understanding includes the following steps.

Step 401, acquiring first spoken language information and a first analysis result for the first spoken language information.

In this embodiment, an executing body (e.g., the server or the terminal shown in FIG. 1) of the method for outputting analysis abnormality information in a spoken language understanding may first acquire the first spoken language information and the first analysis result for the first spoken language information.

Step 402, determining whether the first analysis result includes intent information.

In this embodiment, the above executing body may determine whether the first analysis result acquired in step 401 includes the intent information.

Step 403, determining whether the first analysis result includes word slot information.

In this embodiment, the above executing body may determine whether the first analysis result includes the word slot information. The word slot information may include a word slot type and a word slot value. It should be noted that step 403 may be performed before step 402, may be performed after step 402, or may be performed in synchronization with step 402.

Step 404, determining whether the intent information and the word slot information included in the first analysis result and conversation state information constitute a performable candidate operation, in response to determining the first analysis result including the intent information and the word slot information.

In this embodiment, in response to determining the first analysis result including the intent information and the word slot information in step 402 and step 403, the above executing body may determine whether the intent information and the word slot information included in the first analysis result, and the conversation state information constitute the performable candidate operation. The first analysis result may include several possible candidates for a combination of an intent and a word slot. The conversation state information may be from a previous round of dialogue, a historical dialogue and/or a system setting. Whether the intent information, the word slot information and the conversation state information constitute the performable candidate operation may be determined according to a preset rule or a pre-trained model.

In some alternative implementations of this embodiment, the conversation state information is from a second analysis result for second spoken language information, the second spoken language information including spoken language information in a previous round of conversation of the first spoken language information. The previous round of conversation may include a conversation occurring before the current round of conversation in a dialogue. For example, in the conversation group, the user inputs "departure, Beijing," the device replies "being heading for Beijing," and the user inputs "departing from Beijing" again. Here, "departure, Beijing" is the spoken language information in the previous round of conversation of "departing from Beijing." The acquisition of the spoken language information in the previous round of conversation further enriches the data sources used to determine the abnormality of the analysis, thus making the outputted analysis abnormality information more comprehensive.

In some alternative implementations of this embodiment, the determining whether the intent information and the word slot information included in the first analysis result, and conversation state information constitute a performable candidate operation includes: determining whether the conversation state information includes intent information of a to-be-filled word slot matching the word slot information included in the first analysis result, in response to determining a type of the intent information included in the first analysis result being updating a word slot; and determining that the intent information and the word slot information included in the first analysis result, and the conversation state information do not constitute the performable candidate operation, in response to determining the conversation state information not including the intent information of the to-be-filled word slot. As an example, the first spoken language information is "autumn water conference room," and first analysis result is "updating a word slot (conference room name=autumn water conference room)." However, there is no intent information "booking a conference room" in the current round of conversation state information, and the operation of updating the word slot can be performed only in the situation where there is the intent information. Therefore, "updating a word slot (conference room name=autumn water conference room)" is illegal in the current conservation state. It indicates that the SLU does not recognize the required candidate "booking a conference room (conference room name=autumn water conference room)," and thus, it is considered that this analysis result is abnormal.

Step 405, outputting information indicating an existence of an abnormality in the first analysis result, in response to determining the intent information and the word slot information included in the first analysis result, and the conversation state information not constituting the performable candidate operation.

In some alternative implementations of this embodiment, the method further includes: determining whether the first spoken language information includes to-be-clarified information, in response to determining the intent information and the word slot information included in the first analysis result, and the conversation state information constituting the performable candidate operation; and outputting the information indicating the existence of the abnormality in the first analysis result, in response to determining the first spoken language information including the to-be-clarified information. The to-be-clarified information may include information that needs to be clarified through a next round of conversation or other ways in which inputted information may be acquired. The to-be-clarified information may be recognized through a preset rule or a pre-trained machine learning model.

In some alternative implementations of this embodiment, the intent information and the word slot information included in the first analysis result, and the conversation state information constitute at least two performable candidate operations. The determining whether the first spoken language information includes to-be-clarified information includes: acquiring a confidence level of each of the performable candidate operations constituted by the intent information and the word slot information included in the first analysis result, and the conversation state information; and determining whether the first spoken language information includes the to-be-clarified information according to the acquired confidence level. The confidence level of each of the performable candidate operations constituted by the intent information, the word slot information and the conversation state information may be determined by the SLU, or may be determined by other pre-trained machine learning models.

In some alternative implementations of this embodiment, the determining whether the first spoken language information includes the to-be-clarified information according to the acquired confidence level includes: determining the first spoken language information including the to-be-clarified information, in response to the acquired confidence level being smaller than a preset confidence level threshold. As an example, the first spoken language information is "I want to go out." The confidence level of the performable candidate operation "route planning (destination=go out)" in the first analysis result is 0.02, and the confidence level is very low and less than the preset confidence level threshold, and thus, the clarification is required.

In some alternative implementations of this embodiment, the determining whether the first spoken language information includes the to-be-clarified information according to the acquired confidence level includes: sorting candidate operations greater than the confidence level threshold in a descending order of the confidence level, and outputting the information indicating the existence of the abnormality in the first analysis result, in response to a difference between a confidence level of a candidate operation ranked first and a confidence level of a candidate operation ranked second being less than a preset threshold. As an example, the first spoken language information is "Beijing." In the first analysis result, the confidence level of the candidate operation "route planning (destination=Beijing)" ranked first is 0.8, and the confidence level of the candidate operation "route planning (origin=Beijing)" ranked second is 0.8, too. Both understandings are possible and thus, the clarification is required.

In this embodiment, the operations of steps 401 and 402 are substantially the same as those of steps 201 and 202, which will not be repeatedly described here.

It may be seen from FIG. 4 that, as compared with the embodiment corresponding to FIG. 2, the flow 400 of the method for outputting analysis abnormality information in a spoken language understanding in this embodiment makes the outputted analysis abnormality information more comprehensive by determining whether the intent information and the word slot information included in the first analysis result and the conversation state information constitute the performable candidate operation.

Figure 5:
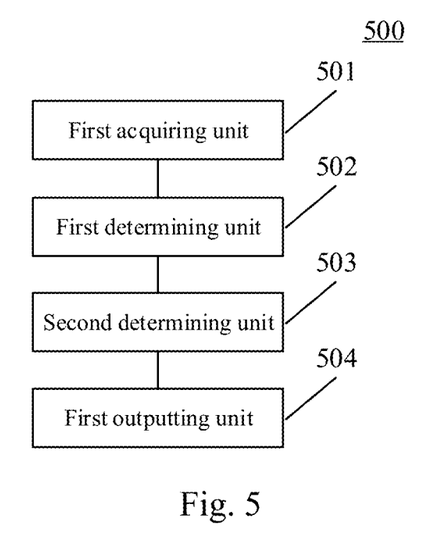
FIG. 5 is a schematic structural diagram of an apparatus for outputting analysis abnormality information in a spoken language understanding according to an embodiment of the present disclosure.

Further referring to FIG. 5, as an implementation of the method shown in the above drawings, an embodiment of the present disclosure provides an apparatus for outputting analysis abnormality information in a spoken language understanding. The embodiment of the apparatus corresponds to the embodiment of the method shown in FIG. 2, and the apparatus may be applied in various electronic devices.

As shown in FIG. 5, the apparatus 500 for outputting analysis abnormality information in a spoken language understanding in this embodiment includes a first acquiring unit 501, a first determining unit 502, a second determining unit 503 and a first outputting unit 504. Here, the first acquiring unit is configured to acquire first spoken language information and a first analysis result for the first spoken language information. The first determining unit is configured to determine whether the first analysis result includes intent information. The second determining unit is configured to determine whether the first spoken language information includes a predefined word slot value, in response to determining the first analysis result not including the intent information. The first outputting unit is configured to output information indicating an existence of an abnormality in the first analysis result, in response to determining the first spoken language information including the predefined word slot value.

In this embodiment, for specific processes of the first acquiring unit 501, the first determining unit 502, the second determining unit 503 and the first outputting unit 504 in the apparatus 500 for outputting analysis abnormality information in a spoken language understanding, reference may be made to step 201, step 202, step 203 and step 204 in the corresponding embodiment of FIG. 2.

In some alternative implementations of this embodiment, the apparatus further includes a third determining unit, configured to determine whether the first analysis result includes word slot information; a fourth determining unit, configured to determine whether the intent information and the word slot information included in the first analysis result, and conversation state information constitute a performable candidate operation, in response to determining the first analysis result including the intent information and the word slot information; and a second outputting unit, configured to output the information indicating the existence of the abnormality in the first analysis result, in response to determining the intent information and the word slot information included in the first analysis result, and the conversation state information not constituting the performable candidate operation.

In some alternative implementations of this embodiment, the conversation state information is from a second analysis result for second spoken language information, the second spoken language information including spoken language information in a previous round of conversation of the first spoken language information.

In some alternative implementations of this embodiment, the fourth determining unit includes: a first determining module, configured to determine whether the conversation state information includes intent information of a to-be-filled word slot matching the word slot information included in the first analysis result, in response to determining a type of the intent information included in the first analysis result being updating a word slot; and a second determining module, configured to determine that the intent information and the word slot information included in the first analysis result and the conversation state information do not constitute the performable candidate operation, in response to determining the conversation state information not including the intent information of the to-be-filled word slot.

In some alternative implementations of this embodiment, the apparatus further includes: a fifth determining unit, configured to determine whether the first spoken language information includes to-be-clarified information, in response to determining the intent information and the word slot information included in the first analysis result and the conversation state information constituting the performable candidate operation; and a third outputting unit, configured to output the information indicating the existence of the abnormality in the first analysis result, in response to determining the first spoken language information including the to-be-clarified information.

In some alternative implementations of this embodiment, the intent information and the word slot information included in the first analysis result and the conversation state information constitute at least two performable candidate operations. The fifth determining unit includes: a first acquiring module, configured to acquire a confidence level of each of the performable candidate operations constituted by the intent information and the word slot information included in the first analysis result and the conversation state information; and a third determining module, configured to determine whether the first spoken language information includes the to-be-clarified information according to the acquired confidence level.

In some alternative implementations of this embodiment, the third determining module is further configured to: determine the first spoken language information including the to-be-clarified information, in response to the acquired confidence level being smaller than a preset confidence level threshold.

In some alternative implementations of this embodiment, the third determining module is further configured to: sort candidate operations greater than the confidence level threshold in a descending order of a confidence level, and output the information indicating the existence of the abnormality in the first analysis result, in response to a difference between a confidence level of a candidate operation ranked first and a confidence level of a candidate operation ranked second being less than a preset threshold.

In some alternative implementations of this embodiment, the apparatus further includes: a second acquiring unit, configured to acquire third spoken language information and a third analysis result for the third spoken language information, the third spoken language information including spoken language information in a next round of conversation of the first spoken language information.

In some alternative implementations of this embodiment, the apparatus further includes: a fourth outputting unit, configured to output the information indicating the existence of the abnormality in the first analysis result, in response to determining the first spoken language information including a word slot value in the third analysis result and determining the first analysis result not including the word slot value in the third analysis result.

In some alternative implementations of this embodiment, the apparatus further includes: a fifth outputting unit, configured to output the information indicating the existence of the abnormality in the first analysis result, in response to determining the third analysis result including the intent information and the word slot information, determining the first analysis result not including the intent information and/or the word slot information, and determining a similarity between the first spoken language information and the third spoken language information exceeding a preset threshold.

According to the apparatus for outputting analysis abnormality information in a spoken language understanding provided in the above embodiment of the present disclosure, the first spoken language information and the first analysis result for the first spoken language information are acquired. Whether the first analysis result includes the intent information is determined. In response to determining the first analysis result not including the intent information, whether the first spoken language information includes the predefined word slot value is determined. In response to determining the first spoken language information including the predefined word slot value, the information indicating the existence of the abnormality in the first analysis result is outputted. Thus, the efficiency of outputting the analysis abnormality information in the spoken language understanding is improved.

Figure 6:
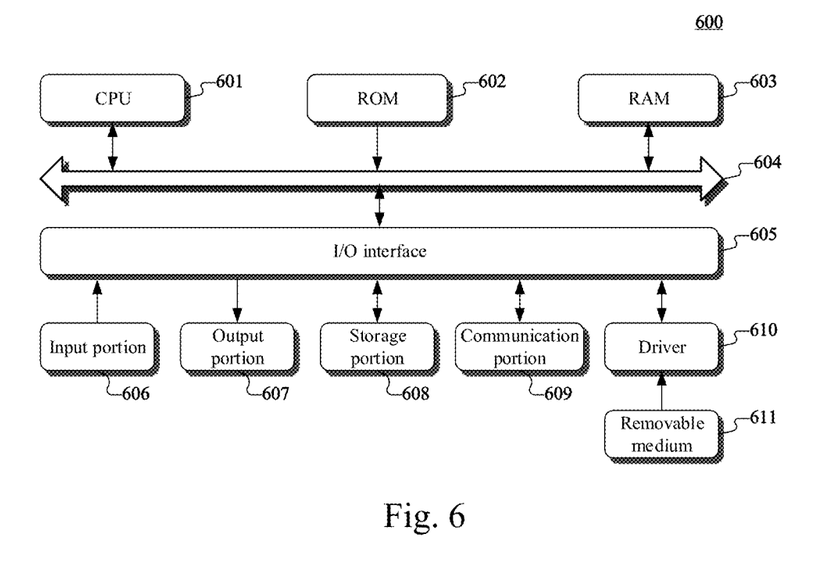
FIG. 6 is a schematic structural diagram of a computer system adapted to implement a server or a terminal according to some embodiments of the present disclosure.

Referring to FIG. 6, FIG. 6 is a schematic structural diagram of a server or a computer system 600 of a terminal adapted to implement embodiments of the present disclosure. The server or terminal shown in FIG. 6 is merely an example, and should not bring any limitations to the functions and the scope of use of the embodiments of the present disclosure.

As shown in FIG. 6, the computer system 600 may include a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including, for example, a keyboard, a mouse, or the like; an output portion 607 including, for example, a cathode ray tube (CRT), a liquid crystal display (LCD), a speaker or the like; a storage portion 608 including, for example, a hard disk or the like; and a communication portion 609 including a network interface card such as a LAN card, modem, or the like. The communication portion 609 performs communication processing via a network such as the Internet. The driver 610 is also connected to the I/O interface 605 as needed. A removable medium 611, such as a magnetic disk, an optical disk, a magneto-optical disk, a semiconductor memory, or the like, is installed on the drive 610 as needed, so that the computer program read out therefrom is installed into the storage portion 608 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the CPU 601, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor. For example, the processor may be described as: a processor comprising a first acquiring unit, a first determining unit, a second determining unit and a first outputting unit. Here, the names of these units do not in some cases constitute a limitation to such units themselves. For example, the first acquiring unit may alternatively be described as "a unit for acquiring first spoken language information and a first analysis result for the first spoken language information."

In another aspect, an embodiment of the present disclosure further provides a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: acquire first spoken language information and a first analysis result for the first spoken language information; determine whether the first analysis result includes intent information; determine whether the first spoken language information includes a predefined word slot value, in response to determining the first analysis result not including the intent information; and output information indicating an existence of an abnormality in the first analysis result, in response to determining the first spoken language information including the predefined word slot value.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A computer-implemented method for outputting analysis abnormality information in a spoken language understanding, comprising:
    acquiring first spoken language information and a first analysis result for the first spoken language information;
    determining whether the first analysis result includes intent information;
    determining whether the first spoken language information includes a predefined word slot value, in response to determining the first analysis result not including the intent information; and
    outputting information indicating an existence of an abnormality in the first analysis result, in response to determining the first spoken language information including the predefined word slot value;
    wherein the method further comprises:
    determining whether the first analysis result includes word slot information;
    determining whether the intent information and the word slot information included in the first analysis result, and conversation state information constitute a performable candidate operation, in response to determining the first analysis result including the intent information and the word slot information; and
    outputting the information indicating the existence of the abnormality in the first analysis result, in response to determining the intent information and the word slot information included in the first analysis result, and the conversation state information not constituting the performable candidate operation;
    wherein the method further comprises:
    in response to determining that the intent information and the word slot information included in the first analysis result, and the conversation state information constitute at least two performable candidate operations, determining whether the first spoken language information includes to-be-clarified information by: acquiring a confidence level of each of the performable candidate operations constituted by the intent information and the word slot information included in the first analysis result, and the conversation state information, wherein the intent information, the word slot information, or the conversation state information is determined by one or more pre-trained machine learning models; and determining whether the first spoken language information includes the to-be-clarified information according to the acquired confidence level; and
    outputting the information indicating the existence of the abnormality in the first analysis result, in response to determining that the first spoken language information includes the to-be-clarified information.

2. The method according to claim 1, wherein the conversation state information is from a second analysis result for second spoken language information, the second spoken language information including spoken language information in a previous round of conversation of the first spoken language information.

3. The method according to claim 1, wherein the determining whether the intent information and the word slot information included in the first analysis result, and conversation state information constitute a performable candidate operation comprises:
    determining whether the conversation state information includes intent information of a to-be-filled word slot matching the word slot information included in the first analysis result, in response to determining a type of the intent information included in the first analysis result being updating a word slot; and
    determining that the intent information and the word slot information included in the first analysis result, and the conversation state information do not constitute the performable candidate operation, in response to determining the conversation state information not including the intent information of the to-be-filled word slot.

4. The method according to claim 1, wherein the determining whether the first spoken language information includes the to-be-clarified information according to the acquired confidence level further comprises:
    determining the first spoken language information including the to-be-clarified information, in response to the acquired confidence level being smaller than a preset confidence level threshold; or
    sorting candidate operations greater than the confidence level threshold in a descending order of a confidence level, and outputting the information indicating the existence of the abnormality in the first analysis result, in response to a difference between a confidence level of a candidate operation ranked first and a confidence level of a candidate operation ranked second being less than a preset threshold.

5. The method according to claim 1, further comprising:
    acquiring third spoken language information and a third analysis result for the third spoken language information, the third spoken language information including spoken language information in a next round of conversation of the first spoken language information.

6. The method according to claim 5, further comprising:
    outputting the information indicating the existence of the abnormality in the first analysis result, in response to determining the first spoken language information including a word slot value in the third analysis result and determining the first analysis result not including the word slot value in the third analysis result.

7. The method according to claim 5, further comprising:
    outputting the information indicating the existence of the abnormality in the first analysis result, in response to determining the third analysis result including the intent information and the word slot information, determining the first analysis result not including the intent information and/or the word slot information, and determining a similarity between the first spoken language information and the third spoken language information exceeding a preset threshold.

8. An apparatus for outputting analysis abnormality information in a spoken language understanding, comprising:
at least one processor; and
a memory storing instructions, wherein the instructions when executed by the at least one processor, cause the at least one processor to perform operations, the operations comprising:
acquiring first spoken language information and a first analysis result for the first spoken language information;
determining whether the first analysis result includes intent information;
determining whether the first spoken language information includes a predefined word slot value, in response to determining the first analysis result not including the intent information; and
outputting information indicating an existence of an abnormality in the first analysis result, in response to determining the first spoken language information including the predefined word slot value;
wherein the operations further comprise:
determining whether the first analysis result includes word slot information;
determining whether the intent information and the word slot information included in the first analysis result, and conversation state information constitute a performable candidate operation, in response to determining the first analysis result including the intent information and the word slot information; and
outputting the information indicating the existence of the abnormality in the first analysis result, in response to determining the intent information and the word slot information included in the first analysis result, and the conversation state information not constituting the performable candidate operation;
wherein the operations further comprise:
in response to determining that the intent information and the word slot information included in the first analysis result, and the conversation state information constitute at least two performable candidate operations, determining whether the first spoken language information includes to-be-clarified information by: acquiring a confidence level of each of the performable candidate operations constituted by the intent information and the word slot information included in the first analysis result, and the conversation state information, wherein the intent information, the word slot information, or the conversation state information is determined by one or more pre-trained machine learning models; and determining whether the first spoken language information includes the to-be-clarified information according to the acquired confidence level; and
outputting the information indicating the existence of the abnormality in the first analysis result, in response to determining that the first spoken language information includes the to-be-clarified information.

9. The apparatus according to claim 8, wherein the conversation state information is from a second analysis result for second spoken language information, the second spoken language information including spoken language information in a previous round of conversation of the first spoken language information.

10. The apparatus according to claim 8, wherein the determining whether the intent information and the word slot information included in the first analysis result, and conversation state information constitute a performable candidate operation comprises:
determining whether the conversation state information includes intent information of a to-be-filled word slot matching the word slot information included in the first analysis result, in response to determining a type of the intent information included in the first analysis result being updating a word slot; and
determining that the intent information and the word slot information included in the first analysis result, and the conversation state information do not constitute the performable candidate operation, in response to determining the conversation state information not including the intent information of the to-be-filled word slot.

11. The apparatus according to claim 8, wherein the determining whether the first spoken language information includes the to-be-clarified information according to the acquired confidence level further comprises:
determining the first spoken language information including the to-be-clarified information, in response to the acquired confidence level being smaller than a preset confidence level threshold; or
sorting candidate operations greater than the confidence level threshold in a descending order of a confidence level, and outputting the information indicating the existence of the abnormality in the first analysis result, in response to a difference between a confidence level of a candidate operation ranked first and a confidence level of a candidate operation ranked second being less than a preset threshold.

12. The apparatus according to claim 8, wherein the operations further comprise:
acquiring third spoken language information and a third analysis result for the third spoken language information, the third spoken language information including spoken language information in a next round of conversation of the first spoken language information.

13. The apparatus according to claim 12, wherein the operations further comprise:
outputting the information indicating the existence of the abnormality in the first analysis result, in response to determining the first spoken language information including a word slot value in the third analysis result and determining the first analysis result not including the word slot value in the third analysis result.

14. The apparatus according to claim 12, wherein the operations further comprise:
outputting the information indicating the existence of the abnormality in the first analysis result, in response to determining the third analysis result including the intent information and the word slot information, determining the first analysis result not including the intent information and/or the word slot information, and determining a similarity between the first spoken language information and the third spoken language information exceeding a preset threshold.

* * * * *